United States Patent Office 3,840,642
Patented Oct. 8, 1974

3,840,642
PROCESS AND CATALYST FOR TREATING
COMBUSTION EXHAUST GAS
John S. Negra, South Plainfield, John T. Tourtellotte, Westfield, and Abe Warshaw, Matawan, N.J., assignors to Chemical Construction Corporation, New York, N.Y.
No Drawing. Continuation of application Ser. No. 55,998, July 17, 1970. This application Mar. 23, 1972, Ser. No. 237,516
Int. Cl. B01d 47/00
U.S. Cl. 423—213.7
4 Claims

ABSTRACT OF THE DISCLOSURE

The exhaust gas discharged from internal combustion engines or the like is treated to convert harmful or noxious pollutant components such as nitrogen oxides, carbon monoxide and unburned hydrocarbons to innocuous compounds, by contacting the exhaust gas with two stages in series of a catalyst composition containing 5.0 to 12.0% by weight of copper as equivalent copper oxide and 0.5 to 4.0% by weight of cobalt as equivalent cobalt oxide, deposited on particles of alpha alumina. The catalyst may also contain a small proportion of manganese. Air is injected into the partially reacted exhaust gas between stages, so that a reduction of nitrogen oxides takes place in the first catalytic stage or bed, and oxidation of carbon monoxide and hydrocarbons to innocuous compounds such as carbon dioxide and water vapor takes place in the second catalytic stage or bed.

---

The present application is a continuation of allowed and abandoned U.S. patent application No. 55,998 filed July 17, 1970.

BACKGROUND OF THE INVENTION

Field of the Invention

The invention relates to the elimination of deleterious compounds such as nitrogen oxides, carbon monoxide and residual hydrocarbons, which are present in the exhaust gas from internal combustion engines such as diesel engines or gasoline-burning automobile engines, so as to prevent the discharge of these noxious components into the atmosphere, and thereby prevent air pollution. The term internal combustion engine will be understood to encompass other types of combustion devices and engines such as gas turbines or the like.

Description of the Prior Art

In recent years it has been recognized that the exhaust gas discharged from internal combustion engines is a serious source of air pollution, especially in metropolitan areas. In some cases, a so-called smog is generated due to atmospheric inversions and accumulation of such exhaust gases in the atmosphere. Recent attempts to prevent such air pollution have concentrated on the destruction or elimination of noxious components by catalysis, especially by admixture of secondary air into the exhaust gas followed by catalytic oxidation of residual hydrocarbons, carbon monoxide, etc., in various types of apparatus specially designed for this purpose. Improvements in active catalytic agents for this function are described in U.S. Pats. Nos. 3,053,773; 3,429,656; 3,316,057 and 3,476,508. Copper-bearing catalysts are generally described in U.S. Pats. Nos. 3,398,101; 3,477,893, 3,493,325 and 3,133,029. A typical two-stage apparatus for carrying out the process with interstage air injection is described in U.S. Patent application No. 33,359 filed Apr. 30, 1970, now U.S. Pat. No. 3,656,915.

SUMMARY OF THE INVENTION

In the present invention, it has been determined that a catalytic agent containing copper in the range of 5.0% to 12.0% by weight of equivalent copper oxide and cobalt in the range of 0.5% to 4.0% by weight of equivalent cobalt oxide deposited on alpha alumina particles provides a highly effective catalyst for treating exhaust gases from internal combustion engines or the like, in order to reduce nitrogen oxides to nitrogen, and also oxidize carbon monoxide and residual vaporous hydrocarbons to carbon dioxide and water vapor. The catalyst may also contain 0.5% to 2% manganese dioxide. The copper will generally be present as CuO and the cobalt will generally be present as $Co_2O_3$, however these metals may be at least partially present as reduced oxides or in the metallic state. Similar considerations apply to manganese, when present. In the description and claims infra, catalyst compositions will refer to these metallic components in terms of equivalent oxide content, however the copper and cobalt may be partially present in actuality as other compounds or as reduced elemental metals or in the metallic state. However, equivalent oxide composition in accordance with the formulas supra is reported on analysis, as is customary in the art.

The exhaust gas is passed through two catalyst beds or masses in series containing copper oxide and cobalt oxide deposited on particles of alpha alumina. Air is injected into the partially reacted gas between the beds or stages, so that the initial bed functions as a reducing medium to eliminate nitrogen oxides and the final bed acts as an oxidizing agent to oxidize carbon monoxide and residual hydrocarbon vapors. It has been determined that highly beneficial results are thereby attained, in terms of removal of nitrogen oxides from the exhaust gas by reduction, and removal of carbon monoxide and hydrocarbon vapors by oxidation, due to the synergistic action of the copper and cobalt together with the alpha alumina. Thus, the invention is practiced with two catalyst beds in series, in which series flow of exhaust gas takes place through the two beds and air which may be preheated is injected into the partially reacted exhaust gas between beds. A typical apparatus for carrying out the process is described in U.S. patent application No. 33,359 filed Apr. 30, 1970 now U.S. Pat. No. 3,656,915. A temperature level generally in the range of 200° C. to 800° C. will usually be provided in the catalyst beds during reaction, however the invention may be practiced at lower temperatures, such as when starting a cold automobile engine, or at temperatures above 800° C.

It is an object of the present invention to provide an improved process and catalyst for treating exhaust gases from internal combustion engines to remove noxious components.

Another object is to prevent air pollution due to the discharge of exhaust gas from internal combustion engines.

A further object is to provide an improved process and catalyst for catalytically reducing nitrogen oxides and oxidizing carbon monoxide and hydrocarbon vapor in the exhaust gas from an internal combustion engine.

An additional object is to provide a synergistic combination of specific proportions of copper and cobalt together with alpha alumina, in a catalyst composition for treating the exhaust gas from internal combustion engines.

These and other objects and advantages of the present invention will become evident from the description which follows.

DESCRIPTION OF THE PREFERRED EMBODIMENTS AND EXAMPLES

A catalyst composition was prepared in accordance with the present invention. The catalyst was prepared by double impregnation of alpha alumina (3/16") particles with the nitrate salts of the catalytically active metals: Copper (Cu) and Cobalt (Co). Some ammonium nitrate was also added to assist in the activation procedure. The nitrates are decomposed at 210° C. to 230° C. for a period of at least 24 hours, and preferably 48 hours. Activation is completed by reducing the catalyst at 400° C. to 450° C. with hydrogen. Catalyst compositions were prepared or formulated in a series of tests with equivalent copper oxide content varying from 5.0% to 12.0% by weight, and equivalent cobalt oxide content varying from 0.5% to 4.0% by weight, deposited on alpha alumina. Following are the test results.

EXAMPLE I

TABLE I.—COMPOSITION RANGE OF CATALYST

| | |
|---|---|
| Percent CuO | 6.90–10.30 |
| Percent $Co_2O_3$ | 0.78–1.54 |

TABLE II.—TWO STAGE REACTOR TEST RESULTS*

| | Inlet gas | Exit gas |
|---|---|---|
| Component in gas: | | |
| NOx (p.p.m.) | 1,350 | 215 |
| CO (percent) | 2.84 | 0 |
| $C_6H_{14}$ (p.p.m.) | 1,450 | 22 |
| Temp. (° C.) | 415 | 770 |
| $O_2$ in exit gas (percent) | | 1.0 |

*With interbed air injection.

TABLE III—STABILITY TEST

| | |
|---|---|
| Space Velocity v./v./hr. | 9600 |
| Total Reaction Time (hours) | 4 |
| Temp. at Start of Test ° C. | 700 |
| Maximum Temp. Reached ° C. | 800 |
| Temp. at End of Test ° C. | 360 |
| Inlet NOx Content (p.p.m.) | 1780 |
| Exit NOx (700–800° C.) p.p.m. | <10 |
| Exit NOx (350–360° C.) p.p.m. | 90 |
| Crush Strength at Completion | 90# |

TABLE IV.—SUMMARY OF EXTENDED STABILITY TESTS

| | |
|---|---|
| Time of Test (hours) | 114 |
| Space Velocity (v./v.hr.) | 12,700 |
| Percent Conversion of 0.24% NOx | [1] 96.2 |
| Percent Conversion of 0.24% NOx | [2] 97.6 |

[1] Average of 8 hr. tests @ 200° C.
[2] Average of 106 hr. tests @ 450° C.

EXAMPLE II—EFFECT OF HEXANE

TABLE V.—FEED GAS COMPOSITION

| Component: | Concentration |
|---|---|
| $O_2$ | percent 4.6 |
| CO | do 1.6 |
| NOx | do 0.24 |
| $C_6H_{14}$ | p.p.m. 145 |
| $N_2$ | Remainder |

TABLE VI.—EXIT GAS COMPOSITION AT VARYING TEMPERATURES

| Component | 150° C. | 200° C. | 300° C. |
|---|---|---|---|
| Percent $O_2$ | 3.4 | 3.6 | 2.6 |
| Percent CO | 0.0 | 0.0 | 0.0 |
| Percent NOx | 0.24 | 0.24 | 0.24 |
| $C_6H_{14}$ (p.p.m.) | 90 | 44 | 8 |
| Percent $CO_2$ | 2.4 | 2.4 | 2.6 |
| $N_2$ | Remainder | Remainder | Remainder |

EXAMPLE III.—EFFECT OF INTERBED [1] AIR INJECTION

TABLE VII.—GAS COMPOSITION

| | | Concentration | |
|---|---|---|---|
| | Feed | Final gas | |
| Component | gas, percent | Without air injection | With air injection |
| $N_2$ | 88.43 | 91.64% | 90.75%. |
| CO | 7.62 | 1.77% | 0.00%. |
| $O_2$ | 2.80 | 0.20% | 1.80%. |
| $CO_2$ | 0.36 | 6.04% | 8.20%. |
| $CH_4$ | 0.35 | 0.35% | <0.05% |
| NOx | 0.44 | <10 p.p.m. | 125–236 p.p.m. |

Space Velocity was 11,500 HR$^{-1}$, except after air injection when S.V. was 13,000 HR$^{-1}$. Feed gas temp. was 250–300° C., exit first stage temp. was 480–495° C. and NOx was 107 p.p.m.

EXAMPLE IV—EFFECT OF MANGANESE

The manganese modification of the basic copper-cobalt catalyst was made by formulating a catalyst composition with the following analysis range.

TABLE VIII.—MANGANESE MODIFICATION CATALYST ANALYSIS

| | |
|---|---|
| Percent CuO | 9.5–11.5 |
| Percent $Co_2O_3$ | 2.5–3.5 |
| Percent $MnO_2$ | 0.5–2.0 |

TABLE IX.—TEST RESULTS USING TABLE VIII CATALYST

Tests were made in a two-stage reactor with added air in the second stage. Gas temperature was 250° C. to 350° C. and space velocity was 11,000 to 16,000 v./v./hr. Following are the test results.

| | | Exit gas at time of test | |
|---|---|---|---|
| Component | Test gas | 0900 hrs | 1100 hrs. |
| Percent $O_2$ | 0.0 | 1.0 | 1.0 |
| Percent CO | 1.98 | 0.0 | 0.0 |
| Percent $CO_2$ | 15.81 | 16.8 | 17.0 |
| Percent $N_2$ | 82.21 | 82.2 | 82.0 |
| NOx (p.p.m.) | 2,280 | 355 | 320 |
| $C_6H_{14}$ (p.p.m.) | 160 | 1 | 1 |

| | | Exit gas at time of test | |
|---|---|---|---|
| Component | Test gas | 1300 hrs. | 1600 hrs. |
| Percent $O_2$ | 0.0 | 0.60 | 1.6 |
| Percent CO | 1.19 | 0.0 | 0.0 |
| Percent $CO_2$ | 8.69 | 9.4 | 10.0 |
| Percent $N_2$ | 90.12 | 89.9 | 88.4 |
| NOx (p.p.m.) | 1,420 | 105 | 230 |
| $C_6H_{14}$ (p.p.m.) | 200 | 2 | 1 |

Following are the test results for a single stage reactor using the manganese-modified catalyst.

| | | Exit gas | |
|---|---|---|---|
| Component | Test gas | Run #1 | Run #2 |
| Percent $O_2$ | 0.60 | 0.20 | 0.20 |
| Percent CO | 2.19 | 0.00 | 0.00 |
| Percent $CO_2$ | 14.42 | 16.42 | 16.06 |
| Percent $N_2$ | 82.79 | 83.38 | 83.74 |
| NOx (p.p.m.) | 1,000 | <10 | <10 |
| $C_3H_6$ (propylene) | 425 | <4 | <4 |

All of the gas analyses supra in Example IV are on a dry gas basis, however the tests were run with 10% to 13% water vapor in the feed gas.

[1] Between First and Second Stages of Two-Stage Reactor.

What is claimed is:

1. A process for the treatment of exhaust gas from an internal combustion engine to remove noxious components which comprises passing an exhaust gas through first and second stages of catalysis in series, each stage containing solid catalyst particles comprising copper in the range of 5% to 12% by weight of equivalent copper oxide, manganese in the range of 0.5% to 2.0% by weight of equivalent manganese dioxide, and cobalt in the range of 0.5% to 4.0% by weight of equivalent cobalt oxide deposited on alpha alumina, said copper and cobalt being at least partially present in said catalysis stages in the form of reduced oxides, and injecting air into the partially reacted exhaust gas between catalysis stages, whereby nitrogen oxides contained in said exhaust gas are catalytically reduced in the first catalysis stage and carbon monoxide and hydrocarbons contained in said exhaust gas are catalytically oxidized in the second catalysis stage, and a treated exhaust gas of depleted content of noxious components is discharged from the second catalysis stage.

2. The process of Claim 1, in which said internal combustion engine is a gasoline-burning automobile engine.

3. The process of Claim 1, in which said exhaust gas is contacted with solid catalyst particles in said catalysis stages at a temperature in the range of 200° C. to 800° C.

4. The process of Claim 1, in which said copper is present in the range of 9.5% to 11.5% by weight of equivalent copper oxide and said cobalt is present in the range of 2.5% to 3.5% by weight of equivalent cobalt oxide.

References Cited
UNITED STATES PATENTS

| | | | |
|---|---|---|---|
| 3,228,746 | 1/1966 | Howk et al. | 423—213.7 |
| 3,288,943 | 7/1942 | Eastman | 423—213.2 |
| 3,398,101 | 8/1968 | Baker et al. | 423—239 |
| 3,701,822 | 10/1972 | Negra et al. | 423—213 |
| 3,656,915 | 4/1972 | Tourtellotte | 423—213 |
| 3,230,034 | 1/1966 | Stiles | 423—213 |
| 2,025,140 | 12/1935 | Wenzel | 423—213 |
| 3,581,490 | 6/1971 | Morris | 60—30 |
| 3,565,574 | 2/1971 | Kearby | 423—212 |
| 2,924,504 | 2/1969 | Reitmeier | 423—239 |
| 3,392,125 | 7/1968 | Kelly et al. | 423—213 X |

GEORGE O. PETERS, Primary Examiner